Sept. 2, 1952  E. R. ZADEMACH ET AL  2,608,982
SHAFT BEARING SEAL
Filed Oct. 5, 1943  6 Sheets-Sheet 4

INVENTOR.
Erich R. Zademach and
William W. Clarke
BY Moses & Nolte
ATTORNEYS

Patented Sept. 2, 1952

2,608,982

UNITED STATES PATENT OFFICE 2,608,982

SHAFT BEARING SEAL

Erich R. Zademach, Hillside, and William W. Clarke, Summit, N. J., assignors to Metalwash Machinery Company, Irvington, N. J., a co-partnership Application October 5, 1943, Serial No. 504,988

17 Claims. (Cl. 134—122)

The present invention relates to shaft bearing seals, and more particularly to bearing seals of the type adapted to prevent fluid leakage through a shaft opening in a wall. Although the present invention has a wide range of utility, it is particularly useful in preventing leakage of corrosive liquids from a treating chamber containing therein such shaft driven devices as roller conveyors. Such conveyors may, for example, serve to carry articles through the treating chamber to spray them with pickling or other corresive liquids. The invention is in the nature of improvements on the structure shown in our copending application Serial No. 455,179, filed August 18, 1942, now Patent No. 2,409,992, dated October 22, 1946.

One object of the present invention is to provide an effective, comparatively simple shaft bearing seal which can be easily and quickly assembled or disassembled, and which includes a minimum number of threaded fastening or supporting members so arranged as to reduce the possibility of fluid leakage coming in contact with said threaded members.

Various other objects, features and advantages of the invention will be apparent from the following particular description, and from an inspection of the accompanying drawings, in which.

The bearing seals of the present invention are herein disclosed, for example, as applied to a pickling machine 10 in which metal articles while being transported through a treating chamber are subjected to sprays of pickling acid or other corrosive liquids. This treating machine 10 may, for example, include a compartment 11 having side walls 12 and a bottom wall 13. These compartment walls 12 and 13 may be of sheet steel or other metal which may not be resistant to corrosive action, and are protected against the corrosive action of the spray liquid by means of a protective lining 14 extending continuously over the inner faces of said walls 12 and 13. This lining 14 is shown of lead but may be of rubber or other acid resistant material.

A series of aligned substantially parallel conveyor rollers 16 extend across the compartment 11, and are suitably driven to convey articles thereon between guides 17 and through the spray field of a plurality of manifold spray pipes 18 suitably distributed along the conveyor path above and below the conveyor. The articles to be treated may be supported in baskets, and these baskets are moved along the compartment 11 by the conveyor rollers 16.

Each conveyor roller 16 is provided at its opposite ends with shafts 23 and 23a each extending through an opening in side compartment walls 12 and 14 and each supported by a bearing as will be described. These shafts 23 and 23a are desirably of stainless steel or of any other chrome metal alloy or acid resistant material, and the rollers 16 desirably comprise stainless steel tubes tightly fitted over the inner ends of the shafts and firmly secured thereto by plug welding or the like.

Each of the rollers 16 is supported on bearings outside of the compartment 11. For that purpose, there is provided a longitudinal frame 24 extending along each side compartment wall 12 and fastened thereto by any suitable means, as for example, by welding. Each of these frames 24 is shown in the form of an angle-iron with its horizontal leg 25 projecting outwardly from its corresponding side compartment wall 12. A bearing or hanger 26 for each of the roller shafts 23 and 23a is supported from the projecting frame leg 25, and is spaced from said leg by a bracket 27 disposed substantially midway between adjoining roller shafts for the purpose to be described. The side sections of each bracket 27 space the adjacent flanges 30 of adjoining bearings 26 from the projecting frame leg 25.

The bearings 26 as well as the brackets 27 are secured to the frame 24 by means of bolts 31 which pass through the flanges 30 of said bearings, the side sections of the brackets 27 and the frame leg 25. Each of these brackets 27 receives two of these bolts 31. A third bolt 32 passes through each bracket 27 and the projecting frame leg 25, and is disposed behind the two bolts 31 to assist said bolts in firmly securing said bracket to said frame leg for the purpose to be made apparent. Washers 29 may be interposed between the bearings 26 and the brackets 27.

A sprocket wheel 33 is keyed and otherwise secured, as by set screw, to the outer end of each shaft 23 and is so arranged that all the conveyor rollers 16 may be driven by a single chain engaging the series of sprockets 33.

A sealing unit is mounted on the wall 12 surrounding each roller shaft 23, 23a, and is constructed and arranged to prevent substantially fluid leakage along said shaft through said wall. In the form illustrated in Figs. 1 to 6, this sealing unit comprises a splash guard 40 composed of acid resisting material preferably lead or rubber. This splash guard 40 has a cylindrical section 41 extending snugly through an opening 42 in the compartment walls 12 and 14, and an inner conical or other suitable tapering section 43 which extends inwardly in the compartment 11 and which converges towards the interior of said compartment. The outer end of the splash guard 40 is provided with a radially outwardly extending flange 44 bearing against the outer side of the compartment wall 12.

While the disclosed construction when properly installed and operated is substantially leak-proof, there is always a possibility that leakage may develop through accident, misuse or wear. In order to provide for any such unusual conditions, there is arranged a gutter 46 in the form of a trough extending along the outer side of the compartment 12 underneath all of the sealing units in position to receive the leakage dripping from said units. This gutter 46 has a supporting wall 47 which extends along the outer side of the compartment wall 12 and which has an aperture to engage snugly the outer periphery of the guard flange 44. This gutter 46 and its supporting wall 47 are desirably made of non-corrosive material such as lead as shown or may be of steel covered with rubber.

The splash guard 40 is firmly secured to the compartment lead lining 14 and to the lead gutter mounting wall 47, as for example by burned joints 48 as shown, or by means of soft rubber gaskets when a rubber lining is used.

The splash guard 40 in its protective position with respect to the end of the conveyor roller 16 materially reduces the amount of corrosive liquid which may find its way to the wall or shaft openings. An opening 49 in the bottom of the splash guard 40 near the compartment wall serves as a drain for any liquid which might find its way into the interior of said splash guard.

Each sealing device also includes a cup-shaped box or body 50 advantageously formed of one piece from suitable non-corrosive material such as hard rubber, and fitted snugly into the cylindrical section 41 of the splash guard 40. This box 50 is provided with an end plate 51 which extends across the opening defined by the cylindrical section 41 of the splash guard and which has a central bore through which the conveyor shaft 23 or 23a extends with a snug rotative fit. The box 50 also has a cylindrical wall 53 extending with a tight snug peripheral fit into the bore of the cylindrical section 41 of the splash guard 40, and a radially outwardly extending flange 54 at one end of said cylindrical wall. A soft rubber gasket 55 is desirably interposed between the radial flange 54 of the box 50 and the end flange 44 of the splash guard 40.

To retain the box 50 against axial displacement, there is provided a clamping plate 60 desirably of stainless steel or manganese bronze and bearing against the outer face of the box flange 54 through a soft rubber gasket 61 intervening between said clamping plate and said flange. This clamping plate 60 is in the form of a yoke having a central apertured section 62 adapted to bear against the box flange 54, and having mounting radial flanges 64 on opposite sides thereof.

For detachably mounting the plate 60 in clamping position, each bracket 27 has a flange or post 70 mounted against the gutter supporting plate 47 and carrying a stud 71 projecting outwardly therefrom. Each of the clamping plate flanges 64 is provided at its outer end with a substantially semi-circular recess 72 adapted to receive part of the stud 71, so that the adjacent flanges 64 of each pair of adjoining clamping plates 60 conjointly receive loosely one of said studs at their recessed ends. A nut 73 threaded on the stud 71 bears against a washer 74 which encircles said stud and which in turn bears against complemental clamping plate flanges 64. To provide ample clamping space for the nut 73, the flanges 64 on each clamping plate 60 are offset outwardly from their central apertured section 62.

It should be noted that the clamping studs 71 by which the separable parts of the sealing unit are retained in position are mounted substantially midway between adjacent conveyor roller shafts 23, 23a, so that these studs are kept away, as far as economically possible, from said shafts and away from any channels through which corrosive fluid may seep from the interior of the compartment 11 in the event that a bearing becomes worn.

It should also be noted that since one stud 71 serves to clamp the adjacent flanges 64 of adjoining complemental clamping plates 60, the number of these studs employed is reduced to a minimum.

The wall post or flange 70 of each bracket 27 is desirably formed with a lower substantially cylindrical stud carrying section 75 and a pair of reinforcing side ribs 76 extending from the horizontal section of said bracket to said cylindrical section.

Mounted within the hollow or chamber of the box 50 and rotating with the shaft 23 or 23a is a sealing ring 80 snugly embracing said shaft and sealably bearing against the outer face of the end plate 51 of said box to provide a substantially leak-proof radial joint between said end plate and said sealing ring. This sealing ring 80 is desirably of graphite or other material which will form a tight low-friction joint with the box end plate 51, and has a cylindrical flange 81 spaced radially inwardly from the cylindrical box section 53.

For yieldably pressing the sealing ring 80 against the end box plate 51 and at the same time sealing the shaft 23 or 23a against leakage therealong, said sealing ring is formed with a recess 82 extending around said shaft and receiving the end portion of a packing ring 84. This packing ring 84 is desirably of soft rubber and fits snugly around the shaft 23 or 23a. The recess 82 of the sealing ring 80 may be provided with suitable peripheral indentations, such as screw threads 85, into which the soft rubber of the packing ring 84 is forced when the latter is pressed under axial pressure. The inner end of this packing ring 84 may be slightly tapered or reduced in diameter to facilitate entry of said ring into the threaded recess 82 of the sealing ring 80 during assembly.

A suitable gland 88 mounted on a shaft 23 or 23a and bearing against the packing ring 84 is arranged to exert and maintain axial shaft sealing pressure on said ring, and thereby maintain a fluid-tight joint along said shaft and between said packing ring and the end box plate 51. In the form shown, this gland 88 is in the form of a collar slidable along shaft 23 or 23a and desirably constructed of hard rubber integral with the packing ring 84. This gland collar 88 may be retained in fixed position on the shaft 23 or 23a by means of one or more set screws 90 of stainless steel, Monel metal or other non-corrosive material. To prevent the gland collar 88 from splitting as a result of pressure exerted thereon, said collar has a metal core 91 in the form of a cylindrical ring.

The gland collar 88 is disposed close to the box 50 for compactness, so that the set screw 90 may extend within the outer plane of the central apertured section 62 of the clamping plate 60 as shown. To render the set screw 90 so placed easily accessible for turning, the central clamping plate section 62 has a circular chamber 92 along the inner rim around its central aperture.

In the construction of Figs. 1 to 6, the clamping plate 60 is centered with respect to the shafts 23 and 23a through the engagement of its end recesses 72 with the studs 71. In the modified form of construction shown in Figs. 7 and 8, means are provided whereby the clamping plate 60a may be easily centered with respect to the cylinder rings without the assistance of the studs 71. For that purpose, the central section 62a of the plate 60a is provided at the top and bottom with lips or flanges 94 overlapping the periphery of the gasket 61 and of the box flange 54.

In the form of construction shown in Figs. 1 to 8, the adjacent recessed flange ends of adjoining clamping plates 60 are secured in position by a single stud 71 secured to the wall flange 70 of the bracket 27. In the modified form shown in Figs. 9 and 10, the wall post or flange 70a of the bracket 27a carries two studs 71b, and the adjacent recessed flange ends of adjoining clamping plates 60b are positioned to receive these studs respectively for clamping action.

Figure 1:
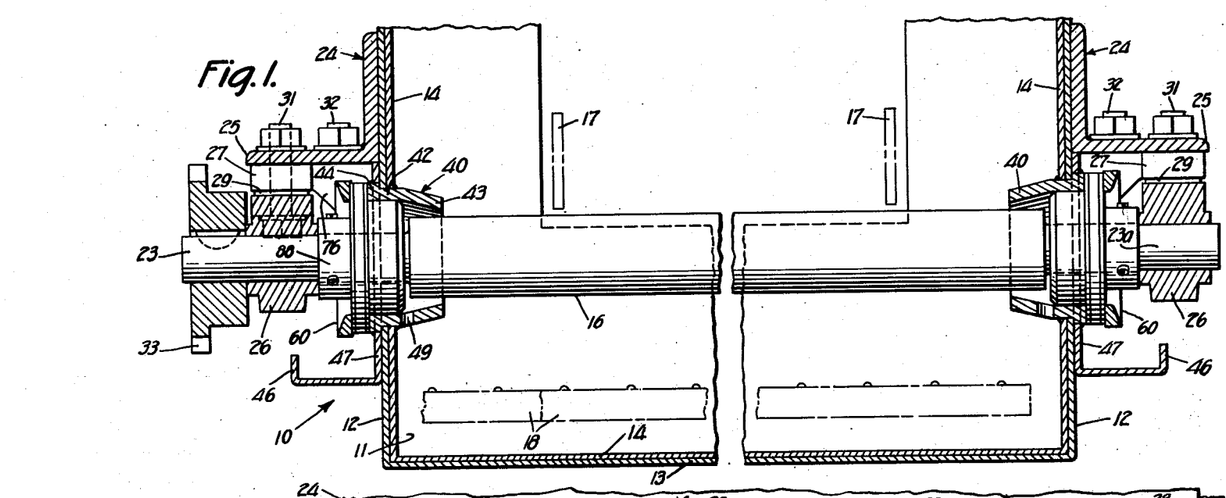
Fig. 1 is a side elevation of a conveyor roller which is provided with a bearing seal at each end, shown partly in side elevation and partly in vertical section, and which is mounted in a spray treating tank shown somewhat diagrammatically in vertical section in the axial plane of the roller.
Figure 2:
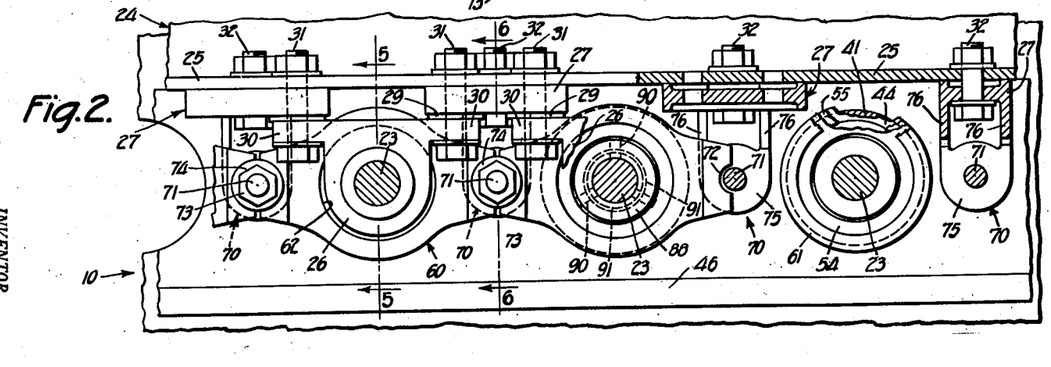
Fig. 2 is a fragmentary view partly in end elevation and partly in vertical section of the bearing seal construction of adjacent conveyor rollers taken along the line 2—2 of Fig. 3.
Figure 3:
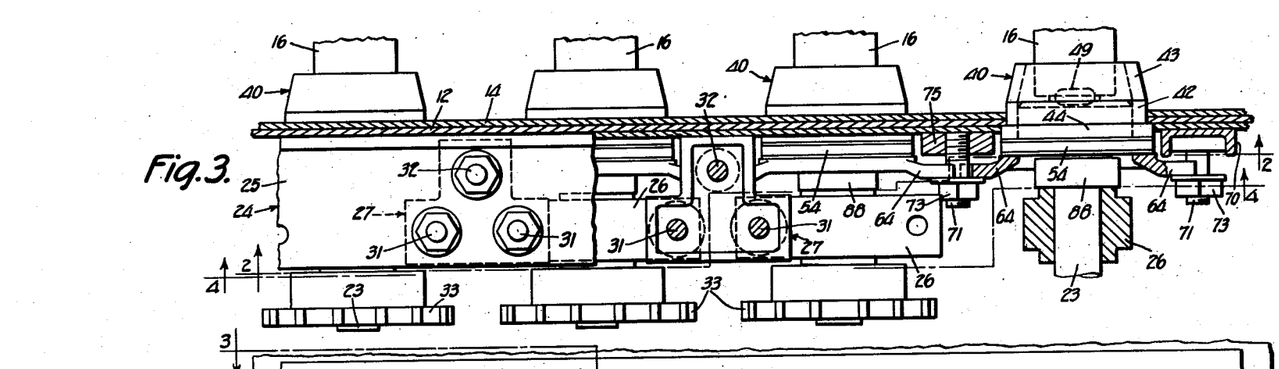
Fig. 3 is a horizontal section through the bearing seal constructions of a number of adjacent conveyor rollers taken approximately along the line 3—3 of Fig. 4.
Figure 4:
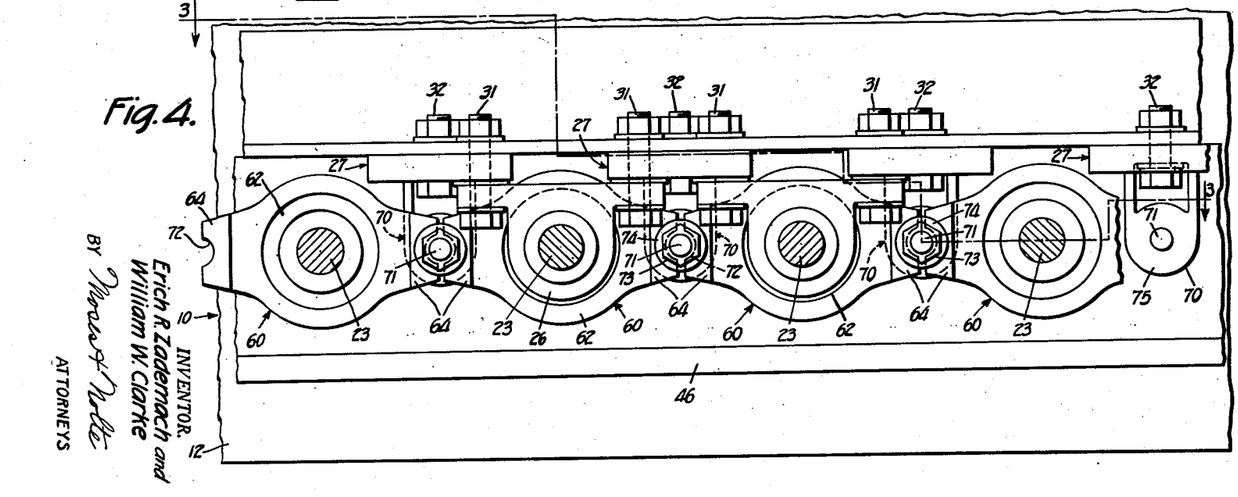
Fig. 4 is a fragmentary view partly in end elevation and partly in vertical section of the bearing seal constructions of adjacent conveyor rollers taken along the line 4—4 of Fig. 3.
Figures 5, 8:
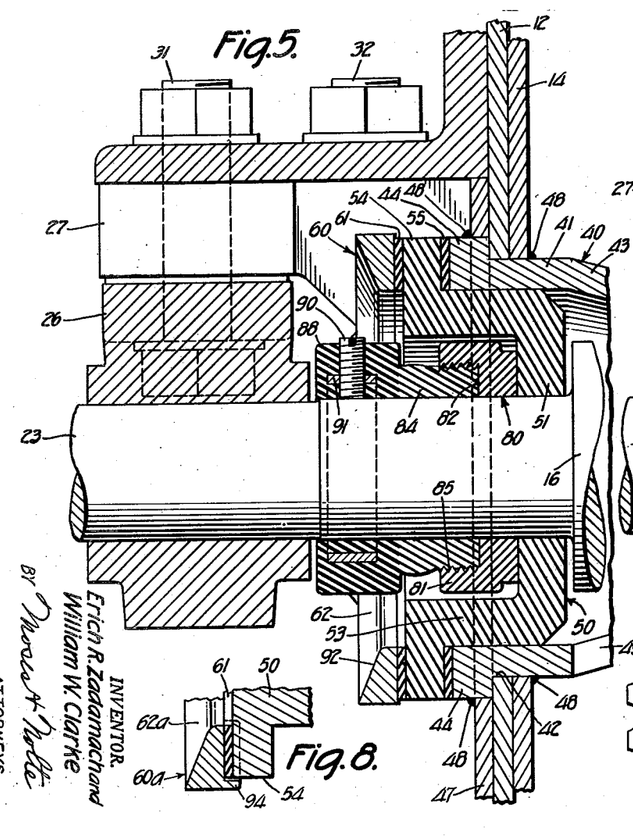
Figs. 5 and 6 are vertical sections taken on lines 5—5 and 6—6 of Fig. 2 respectively, but shown on a larger scale.
Fig. 8 is a section taken on line 8—8 of Fig. 7, but on a larger scale and showing more parts.
Figures 6, 7:
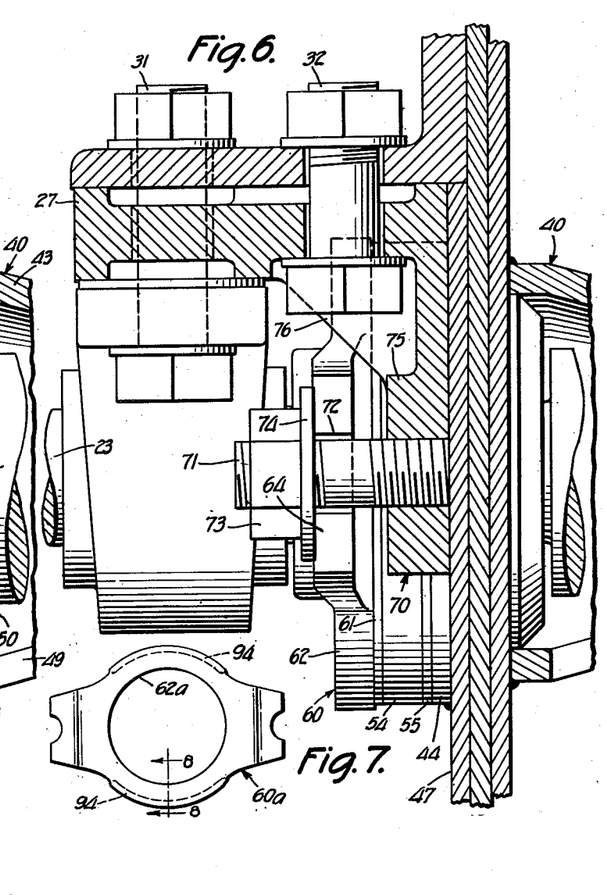
Fig. 7 is a front elevation of the clamping plate of another form of bearing seal embodying the present invention.
Figure 9:
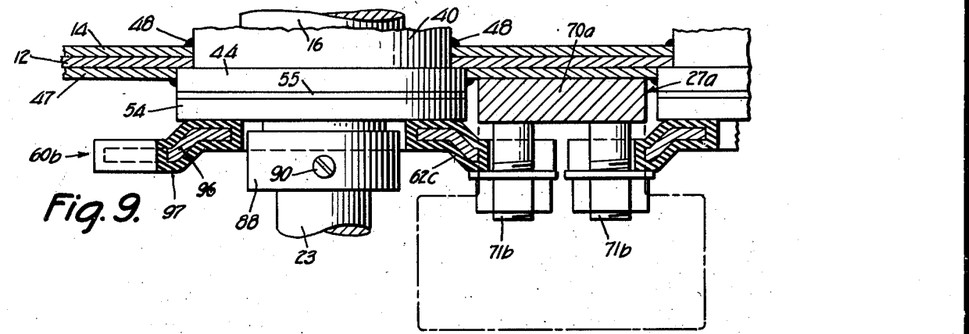
Fig. 9 is a horizontal section of another form of bearing seal and bracket means embodying the present invention and taken along the line 9—9 of Fig. 10.
Figure 10:
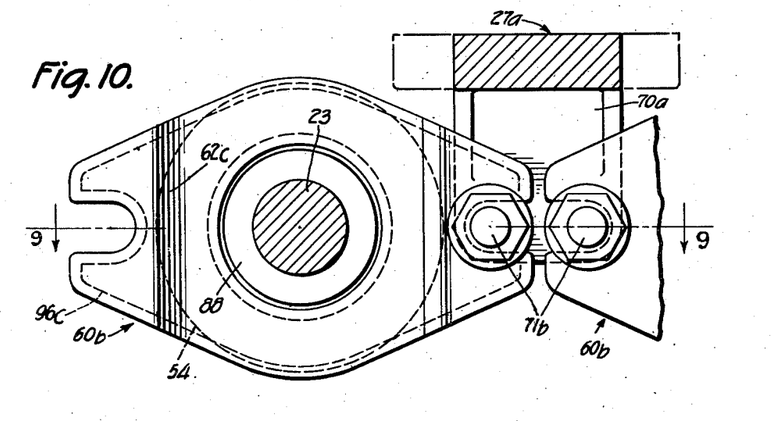
Fig. 10 is an end elevation of the bearing seal and bracket means of Fig. 9.

It should be noted that in the construction of Figs. 1 to 8, the clamping plate 60 or 60a is made entirely of metal, desirably stainless steel, while in the construction of Figs. 9 and 10, the clamping plate 60b has a metal core 96 composed of corrosive metal imbedded in a casing 97 of suitable material such as rubber, which is resistant to corrosive liquids and serves to protect the core 96. This rubber casing 97 bearing directly against the flanged end 54 of the box 50 makes it unnecessary to employ a gasket between the clamping plate 60b and said box end 54, since said casing serves effectively as a gasket. The plate 60c has a depression 62c to clear the set screws 90 or in other words give freedom of access thereto with a screw driver.

Figures 11, 12:
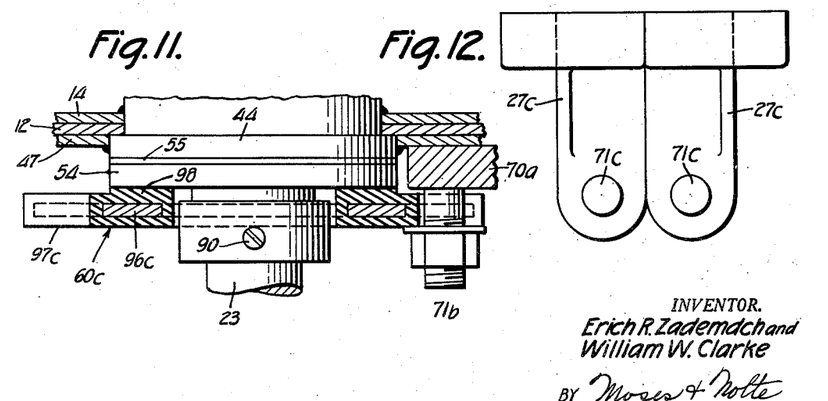
Fig. 11 is a horizontal section of still another form of bearing seal embodying the present invention.
Fig. 12 is a front elevation of another form of bracket means embodying the present invention.

In the constructions of Figs. 1 to 10, the brackets 27 or 27a are made substantially of one piece. In the construction of Fig. 12 two separate brackets 27c disposed in adjoining relationship may be mounted between each pair of adjoining clamping plates 60c, and each one of these brackets may carry a stud 71c by which the adjacent recessed flange ends of adjoining clamping plates may be secured.

In the constructions of Figs. 1 to 10, the clamping plates 60, 60a and 60b have their flange ends offset outwardly from their central apertured section. In the construction of Fig. 11, the clamping plate 60c is substantially flat and clears the set screws 90, but has an axial enlargement 98 on its inner side engaging the outer flange end 54 of the box 50, so that the flange ends of this clamping plate are spaced away from the outer plane of said box end.

Also, in this construction of Fig. 11, the clamping plate 60c has a metal core 96c and an outer casing 97c of material such as rubber resistant to corrosive liquids.

Figure 13:
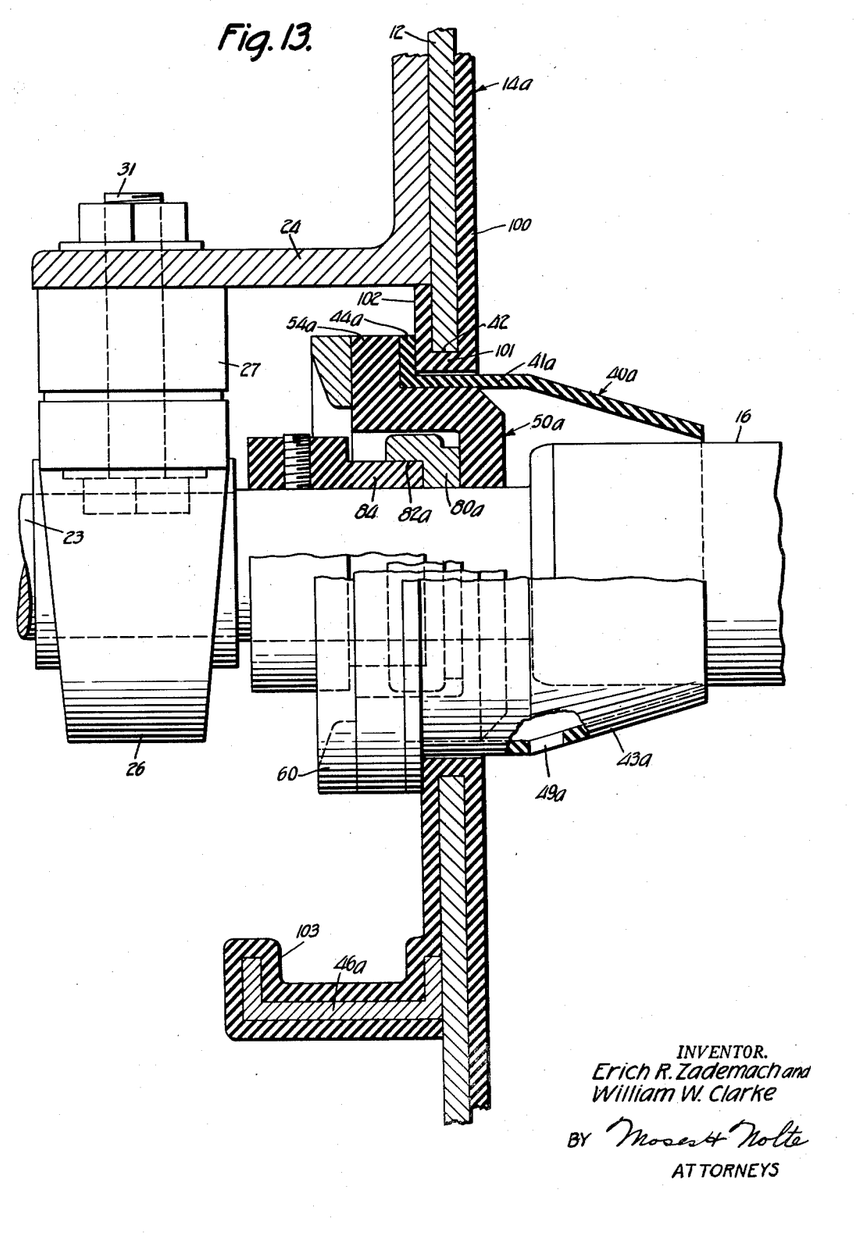
Fig. 13 is a view partly in vertical section and partly in side elevation of another form of bearing seal and associated supporting wall structure embodying the present invention.

In Fig. 13 is shown a modified construction in which each of the side compartment walls 12 instead of being protected against acid corrosion by a lead lining as in the construction of Figs. 1 to 12, is covered with a lining 14a of rubber having a section 100 extending over the inner face of said wall and over the inner face of the bottom wall of the compartment, a section 101 extending over the marginal edge of the wall opening 42 and a section 102 on the outer face of said wall 12 extending upwardly to the frame 24 and downwardly to the gutter 46a. This gutter 46a, desirably of steel, is welded to the compartment wall 12 and is protectively covered against acid corrosion by a rubber lining 103. The wall lining 14a and the gutter lining 103 consist of strips or sheets of rubber juxtaposed in face contact with the metal parts 12 and 46a and vulcanized to said parts to form an integral rubber protective covering therefor.

The splash guard 40a is desirably of rubber, neoprene or other similar acid resistant material having suitable packing properties for the purpose to be made apparent. This splash guard 40a is detachably fitted in the lined wall opening 42 with its cylindrical section 41a extending loosely through said opening, and its radially outwardly extending flange 44a clamped between the rubber lining section 102 and the radially outwardly extending flange 54a of the box 50a. In this manner, the guard flange 44a is utilized as a gasket to prevent outward leakage between the rubber wall covering 102 and the box flange 54a.

If desired, the bottom of the conical section 43a of the splash guard 40a may be provided with one or more drain holes 49a similar to the drain hole 49 in the construction of Figs. 1 to 6.

The sealing ring 80a may be similar to the sealing ring 80 in the construction of Figs. 1 to 6, and may be similarly provided with a screw threaded bore into which the soft rubber end section of the packing ring 84 is forced when said packing ring is axially pressed towards said sealing ring, or said sealing ring 80a may have a smooth cylindrical bore 82a as shown in Fig. 13 to sealably receive the soft rubber end section of said packing ring 84.

Figure 14:
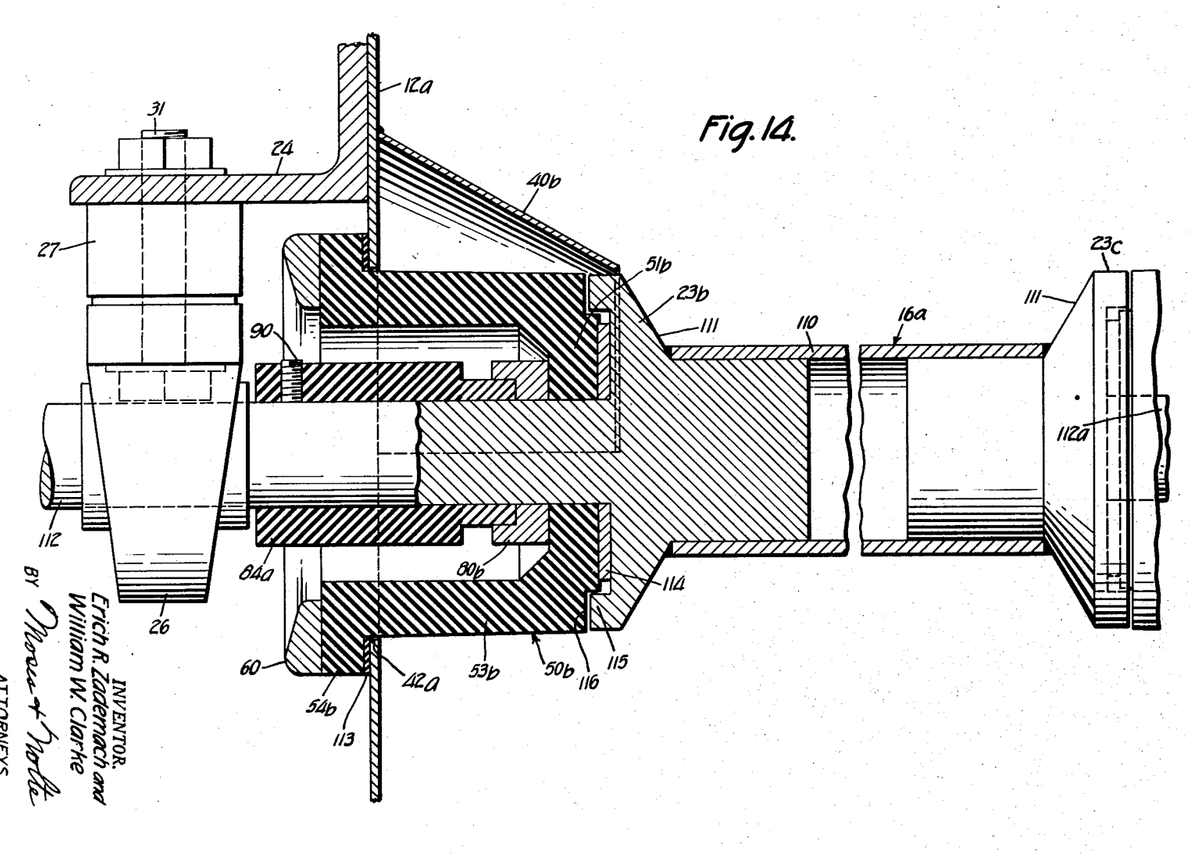
Fig. 14 is a view partly in vertical section and partly in side elevation of another form of bearing seal, conveyor roller and supporting wall structure embodying the present invention.

In Fig. 14 is shown a modified seal, wall and roller construction which embodies the present invention, and which although capable of a wide range of utility, is particularly useful where the articles to be treated are in the form of strips or sheets, as for example magnesium and brass sheets. In this modified construction, instead of providing guides similar to the guides 17 indicated in the construction of Fig. 1 for limiting sideways movement of the articles in their passage through the acid spray in the treating chamber, the conveyor rollers 16a themselves are constructed to serve as side guides for these articles. For that purpose, each of the rollers 16a comprises a shaft tubing 110 and gudgeons 23b and 23c snugly fitted in the opposite ends of this tubing and fixedly retained therein, as for example, by welding. This shaft tubing 110 and gudgeons 23b and 23c are desirably of stainless steel or any other alloy having acid resistant properties.

For guiding the article to be treated through the treating chamber against sideways movement, each of the gudgeons 23b and 23c has a flange 111 of conical shape flaring towards the side walls 12a of the treating chamber. Integral with and extending axially from the outer sides of the respective guide flanges 111 are the journals 112 and 112a passing through respective openings 42a in the side walls 12a of the treating chamber. As the sheets or other articles to be treated are moved along the conveyor means 16a, the steep conical faces on the guide flanges 111 confine these sheets between these flanges.

When weaker acids are used for spraying the work side walls 12a in the form shown in Fig. 14 as well as the bottom wall may be composed of stainless steel or other acid resistant alloy, so that no protective covering of these walls is necessary as in the construction of Figs. 1 to 13.

Extending through the side wall opening 42a is the box 50b, advantageously formed of non-corrosive material, such as hard rubber, and having its radial outwardly extending flange 54b sealably pressing against the outer face of the side compartment wall 12a through an intervening gasket 113 of soft rubber or other suitable packing material. Any number of these gaskets may be provided to afford the desired shimming. The box 50b has a comparatively long cylindrical section 53b extending inwardly into the interior of the treating chamber, and has its end wall 51b adjacent to the outer shoulder face of the flange 111. A sealing washer 114 is provided between the outer face of the end box wall 51b and the outer face of the flange 111 to provide a substantially leakproof radial joint between said faces. This sealing washer 114 is desirably of graphite or other material which will form a tight low-friction joint between the two opposed faces of the flange 111 and of the box wall 51b.

To prevent direct flow communication between the chamber space and the outer peripheral section of the sealing washer 114, a baffle arrangement is provided between the box 50b and the outer peripheral section of the flange 111. For that purpose, the outer peripheral section of each flange 111 has an annular baffle ridge 115 concentric with its respective journal 112 or 112a and extending into a corresponding corner annular recess 116 formed in the peripheral section of the box end wall 51b. This ridge 115 is desirably spaced from the base of the recess 116 a distance which is sufficiently large to prevent engagement of said ridge by the box and wall 51b, and sufficiently small to reduce to a minimum seepage or passage of acid or other treating liquid to the outer edge of the sealing washer 114. This recess and ridge baffle relationship between the box 50b and gudgeon flange 111 forms an offset labyrinthic passage between the open chamber space and the joint defined between said box and said flange, and thereby effectively protects said joint against acid splash or contact.

Although the baffle ridge 115 is shown in the roller flange 111 and the recess 116 in the box 50b, as far as certain aspects of the invention are concerned, these may be reversed to provide the ridge on the box 50b and the recess on the flange 111.

To further protect the radial joint between the box 50b and the gudgeon flange 111 against acid splash, there is provided a splash guard 40b shown in the form of a semicircular hood flaring towards the compartment wall 12a and radially secured thereto, as for example, by welding. This hood 40b is of stainless steel or other non-corrosive alloy, and is disposed over the box 50b. This splash guard or hood 40b desirably extends to the base of the ridge 115 and over the upper half of the passageway defined between the end box wall 51b and the ridge 115, so that the radial joint between the end box wall 51b and the outer shoulder face of the gudgeon flange 111 is further protected against possible acid splashing or leakage therein.

The sealing ring 80b is similar to the sealing ring 80a in the construction of Fig. 13, and is similarly provided with a smooth cylindrical bore for sealably retaining the soft rubber end section of the packing ring 84a. This packing ring 84a is similar to the packing ring 84 in the construction of Fig. 13, except that it is longer in order to accommodate for the longer box 50b employed, and to permit the clamping set screw 90 at the same time to be accessible for turning from the outer side of the clamping plate 60.

We have described what we believe to be the best embodiments of our invention. We do not wish, however, to be confined to the embodiments shown, but what we desire to cover by Letters Patent is set forth in the appended claims.

We claim:

1. In a shaft seal, a wall having an opening, a shaft passing through said opening, a box closing said opening and having a snug rotative fit with said shaft, a packing ring of soft sealing material in said box forming a fluid-tight joint with said shaft, a gland collar of hard material integral with one end of said packing ring and embracing said shaft, said gland collar having a metal core ring encircling said shaft, and a radial set screw in said gland collar passing through said ring and adapted to impinge on said shaft to hold said gland collar in selective axial position along said shaft.

2. A construction for sealing the wall openings for a plurality of substantially parallel conveyor shafts comprising a plurality of annular members, extending from a treating chamber closing said openings and encircling said shafts respectively, a clamping plate having a central apertured section encircling each of said shafts and having flanges extending radially outwardly therefrom in opposite directions, said clamping plate being free from supporting relationship with its respective shaft and bearing against its respective annular member to hold said member against outward movement along said shaft and threaded fastening means substantially midway between adjoining annular members and spaced a substantial distance from said annular members and from all joints leading from said openings for releasably securing the ends of the adjacent flanges of adjoining clamping members in clamping position.

3. A construction for sealing the wall openings of a plurality of substantially parallel shafts comprising a plurality of annular members closing said openings and encircling said shafts respectively, a clamping plate having a central apertured section encircling each of said shafts and having flanges extending radially outwardly therefrom in opposite directions, said clamping plate being free from supporting relationship with its respective shaft and bearing against its respective annular member to hold said member against outward movement along said shaft the end of each flange having a recess, the adjacent flange ends of adjoining clamping plates being close together in alignment, whereby the two recesses of said adjacent flange ends conjointly form an opening substantially midway between adjoining annular members, and a threaded fastening member passing through each of said recess openings for releasably securing the ends of the adjacent flanges of adjoining clamping members in clamping position.

4. A bearing seal construction for the wall openings of a plurality of substantially parallel shafts comprising a frame, a plurality of angular brackets secured to said frame, and each having two flanges, one flange being secured to said frame and the other flange being close to the wall between adjoining shafts, a bearing for each of said shafts on the side of the frame secured flange opposite said frame, threaded fastening members passing through said bearing members, said frame secured flanges and said frame, an annular member closing each wall opening and encircling a respective shaft, a clamping plate axially bearing against one end of said annular member, and threaded fastening means secured to said bracket wall flanges substantially midway between said shafts for supportably engaging the ends of said clamping plates.

5. In a bearing seal construction, the combination comprising a wall having a series of shaft openings, a plurality of substantially parallel shafts extending through said openings respectively, annular members closing said openings and encircling said shafts respectively, a bracket disposed against said wall between each adjoining pair of shafts, a clamping plate bearing axially inwardly against each annular member and having radial flange extensions, said clamping plate being free from supporting connection with its corresponding shaft, and a single threaded fastening member secured to each of said brackets and engaging the adjacent flange ends of adjoining clamping plates to support said plates in position.

6. In a bearing seal construction, the combination comprising a wall having a series of shaft openings, a plurality of substantially parallel shafts extending through said openings respectively, annular members closing said openings and encircling said shafts respectively, a pair of adjoining brackets disposed against said wall between each adjoining pair of shafts, a clamping plate bearing axially inwardly against each annular member and having radial flange extensions, said clamping plate being free from supporting connection with its corresponding shaft, and a threaded fastening member secured to each of said brackets and engaging a respective flange end to support the corresponding clamping plate in position.

7. In an article treating apparatus of the type having a chamber for treating the articles with liquid, a wall for said chamber with an opening, and a shaft passing through said opening, the combination comprising a sealing device encircling said shaft adjacent to said opening for preventing leakage of liquid through said opening from the interior of said chamber, and including a box in said opening encircling said shaft, and means in said box sealing said shaft liquid-tight against leakage through said box and along said shaft, said box having a radially outwardly extending flange near its outer end, an annular splash guard passing through said opening and snugly embracing said box, said splash guard extending into said chamber and having a radially outwardly extending flange near its outer end clamped between said box flange and said wall, a clamping member bearing against each of said boxes to prevent the same from moving axially outwardly along its respective shaft, and means spaced from the flanges of the splash guards for fastening said clamping members in position.

8. In an article treating apparatus, the combination as set forth in claim 7, in which the splash guard is made of corrosion resistant metal, and a member separate from said splash guard and having packing qualities is provided between said flanges.

9. In an article treating apparatus, the combination as set forth in claim 7, in which the splash guard is made of pickling acid resistant material, and its flange serves as a gasket between said box flange and said wall.

10. In an article treating apparatus of the type having a chamber for treating the articles with liquid, a wall for said chamber with an opening, a lining of acid corrosion resistant metal on the inner face of said wall, a shaft passing through said opening, and a bearing for said shaft, the combination comprising a liquid-tight sealing device encircling said shaft adjacent to said opening for preventing leakage of liquid through said opening from the interior of said chamber, and a splash guard passing through said opening and extending into said chamber for protecting said bearing and said sealing device against splashing of treating liquid in said chamber.

11. In an article treating apparatus of the type having a chamber for treating the articles with liquid, a wall for said chamber with an opening, and a shaft passing through said opening, the combination comprising, a lining of rubber extending along the inner face of said wall around the marginal edge of said opening and along the outer face of said wall surrounding said opening, a sealing device encircling said shaft adjacent to said opening for preventing leakage of liquid through said opening from the interior of said chamber, and including a box in said opening encircling said shaft, and means in said box sealing said shaft against leakage through said box and along said shaft, said box having a radially outwardly extending flange near its outer end, and a splash guard passing through said opening and snugly embracing said box, said splash guard extending into said chamber and having a radially outwardly extending flange near its outer end clamped between said box flange and said rubber lining.

12. In an article treating apparatus of the type having a chamber for treating the articles with liquid, a wall for said chamber with an opening, a conveyor roller in said chamber having an end journal passing through said opening, and a bearing for said journal, the combination comprising a sealing device encircling said shaft adjacent to said opening for preventing leakage of treating liquid through said opening from the interior of said chamber and including a box in said opening encircling said shaft and extending into said chamber, and means in said box sealing said shaft against leakage through said box and along said shaft, said box having a radially outwardly extending flange near its outer end, means for clamping said flange against said wall, and a splash guard in said chamber disposed over said box and fixed at one end to the inner face of said wall.

13. In an article treating apparatus of the type having a chamber for treating the articles with corrosive liquid and having a wall with an opening, a shaft passing through said opening and a bearing for said shaft, the combination comprising a lining of rubber on the inner face of said wall for protecting said wall against said liquid, a sealing device enclosing said shaft adjacent to said opening for preventing leakage of liquid through said opening from the interior of said chamber, and a gutter connected to said wall on its outer side and underneath said sealing device, said rubber lining extending along the inner face of said wall, around the marginal edge of said opening, along the outer face of said wall surrounding said opening and over said gutter, said rubber lining having a sealing packing connection with said sealing device.

14. A construction for sealing the wall openings for more than two substantially parallel horizontally spaced rotatable conveyor shafts extending from a treating chamber, comprising a plurality of annular members closing said openings and encircling said shafts respectively, separate clamping members axially bearing against said annular members respectively to prevent the same from being moved axially outwardly along their shafts, said clamping members being free from supporting relationship with said shafts, and means substantially midway between adjoining annular members secured to the sides of said clamping members and spaced a substantial distance from said annular members and from all joints leading from said openings for fastening said clamping members in position.

15. In a construction for sealing the wall openings for more than two substantially parallel horizontally spaced rotatable conveyor shafts extending from a treating chamber, the combination as described in claim 14, said fastening means comprising a threaded member substantially midway between adjoining annular members for releasably securing the adjacent sides of adjoining clamping members in clamping position.

16. In an article treating apparatus of the type having a chamber for treating the articles with liquid, a wall for said chamber with an opening, and a shaft passing through said opening, the combination comprising a sealing device encircling said shaft adjacent to said opening for preventing leakage of liquid through said opening from the interior of said chamber, and including a box in said opening encircling said shaft, and means in said box sealing said shaft against leakage through said box and along said shaft, said box having a radially outwardly extending flange near its outer end, and an annular splash guard of rubber passing through said opening and snugly embracing said box, said splash guard extending into said chamber and having a radially outwardly extending flange near its outer end clamped between said box flange and said wall and serving as a gasket.

17. In an article treating apparatus of the type having a chamber for treating the articles with liquid and a wall for said chamber with an opening, the combination comprising a conveyor roller in said chamber having a central shaft tubing, and a pair of gudgeons extending into the ends of said tubing and having respective guide flanges beyond said tubing for limiting sidewise displacement of articles as they are conveyed along said roller, said gudgeons having respective journals extending axially outwardly from said flanges, one of said journals extending through said wall opening, the flange from which the last mentioned journal extends defining an axially outwardly facing shoulder, a sealing device encircling the last mentioned journal for preventing leakage of treating liquid through said opening from the interior of said chamber and including a box in said opening encircling said last mentioned journal and extending into said chamber, and means in said box sealing said last mentioned journal against leakage through said box and along said last mentioned journal, and means forming a liquid-tight joint between the inner end of said box and said shoulder, said shoulder and said box end having annular interfitting recess and ridge conformations protectively encircling said joint against liquid splash.

ERICH R. ZADEMACH.
WILLIAM W. CLARKE.

REFERENCES CITED

The following references are of record in the file of this patent:

UNITED STATES PATENTS

| Number | Name | Date |
|---|---|---|
| 493,560 | Sague | Mar. 14, 1893 |
| 574,804 | Johnson | Jan. 5, 1897 |
| 582,952 | Roberts | May 18, 1897 |
| 656,319 | Copley et al. | Aug. 21, 1900 |
| 956,981 | Lamp et al. | May 3, 1910 |
| 1,034,696 | Daniels et al. | Aug. 6, 1912 |
| 1,129,915 | Stirling | Mar. 2, 1915 |
| 1,171,946 | Happensack | Feb. 15, 1916 |
| 1,215,107 | Bush | Feb. 6, 1917 |
| 1,361,669 | Bell et al. | Dec. 7, 1920 |
| 1,407,186 | Brown | Feb. 21, 1922 |
| 1,562,642 | Holmstrom | Nov. 24, 1925 |
| 1,609,474 | Jacobson | Dec. 7, 1926 |
| 1,850,683 | Merrill | Mar. 22, 1932 |
| 1,868,860 | Von Reis | July 26, 1932 |
| 1,879,720 | Von Reis | Sept. 27, 1932 |
| 2,091,921 | Greer | Aug. 31, 1937 |
| 2,140,304 | Wishart | Dec. 13, 1938 |
| 2,203,480 | Wood | June 4, 1940 |
| 2,216,544 | True et al. | Oct. 1, 1940 |
| 2,258,921 | Young et al. | Oct. 14, 1941 |
| 2,304,432 | Wood | Dec. 8, 1942 |
| 2,306,417 | Wiessner | Dec. 29, 1942 |
| 2,317,009 | Wilson et al. | Apr. 20, 1943 |
| 2,320,499 | Wood | June 1, 1943 |
| 2,403,526 | Harris | July 9, 1946 |

FOREIGN PATENTS

| Number | Country | Date |
|---|---|---|
| 32,597 | Germany | of 1885 |
| 288,940 | Great Britain | of 1928 |
| 453,262 | Great Britain | of 1836 |